(12) United States Patent
Oshikawa

(10) Patent No.: US 11,161,702 B2
(45) Date of Patent: Nov. 2, 2021

(54) TRANSFER DEVICE

(71) Applicant: MURATA MACHINERY, LTD., Kyoto (JP)

(72) Inventor: Takayuki Oshikawa, Inuyama (JP)

(73) Assignee: MURATA MACHINERY, LTD., Kyoto (JP)

( * ) Notice: Subject to any disclaimer, the term of this patent is extended or adjusted under 35 U.S.C. 154(b) by 0 days.

(21) Appl. No.: 16/867,614

(22) Filed: May 6, 2020

(65) Prior Publication Data
US 2020/0377316 A1 Dec. 3, 2020

(30) Foreign Application Priority Data

May 29, 2019 (JP) .............................. JP2019-100177

(51) Int. Cl.
*B65G 59/04* (2006.01)
*B25J 15/06* (2006.01)

(52) U.S. Cl.
CPC ........... *B65G 59/04* (2013.01); *B25J 15/0666* (2013.01)

(58) Field of Classification Search
CPC .... B65G 59/04; B65G 59/023; B25J 15/0666; B25J 17/02; B25J 15/06; B25J 15/0014; B25J 15/0616; Y10S 414/12; Y10S 414/126; B65H 3/322; B65H 2301/422; B65H 3/50; B65H 3/242
See application file for complete search history.

(56) References Cited

U.S. PATENT DOCUMENTS

| 3,820,667 A | 6/1974 | Critchlow et al. |
| 5,391,050 A * | 2/1995 | Gatteschi .............. B65B 43/126 414/796 |
| 7,878,482 B2 * | 2/2011 | Hernandez, Jr. .......... B66F 3/30 254/93 H |
| 2016/0023851 A1 * | 1/2016 | Gaenz .................. B65G 59/023 294/24 |

FOREIGN PATENT DOCUMENTS

| DE | 102011082967 A1 * | 3/2013 | .............. B65H 3/54 |
| JP | 49-100777 A | 9/1974 | |
| JP | 51-107785 U | 8/1976 | |
| JP | 09323837 A * | 12/1997 | .............. B65H 3/54 |
| JP | 11-123687 A | 5/1999 | |
| JP | 2019-005871 A | 1/2019 | |

* cited by examiner

*Primary Examiner* — Gregory W Adams
(74) *Attorney, Agent, or Firm* — Keating & Bennett, LLP

(57) ABSTRACT

A transfer device to transfer an article by moving the article in a front-rear direction includes a base portion, a support plate movable in the front-rear direction with respect to the base portion and able to support a bottom surface of the article, a front-rear actuator that actuates the support plate in the front-rear direction with respect to the base portion, a suction device that is provided on the base portion to be movable in a vertical direction to suction a side surface of the article, and a vertical actuator that actuates the suction device at least in an ascending direction with respect to the base portion and supports the suction device to be detachable from the suction device in a descending direction.

8 Claims, 16 Drawing Sheets

TRANSFER DEVICE

CROSS REFERENCE TO RELATED APPLICATIONS

This application claims the benefit of priority to Japanese Patent Application No. 2019-100177 filed on May 29, 2019. The entire contents of this application are hereby incorporated herein by reference.

BACKGROUND OF THE INVENTION

1. Field of the Invention

The present invention relates to a transfer device, and more particularly to a transfer device for taking out one or a plurality of materials from a stack of materials.

2. Description of the Related Art

At present, labor shortages in the logistics industry and advances in robot operation technology and image recognition technology promote the movement of using robots for palletizing and depalletizing work, which is heavy labor.

In palletizing and depalletizing operations, an article is usually conveyed while an upper surface of the article is suctioned with air by a hand (a mechanism that is attached to a tip of a robot and actually grips the article).

For example, there is a picking system in which a picking robot picks one article at a time from an uppermost level of an article group including a plurality of stacked articles (e.g., Japanese Unexamined Patent Publication No. 2019-5871).

A conventional picking robot transfers an article while suctioning an upper surface of the article with air. However, in a case of a cardboard box having an opened top surface, it is difficult to transfer the box while suctioning an upper surface of the box.

On the other hand, a picking robot that suctions a side surface of a cardboard box has also been developed. However, in transferring a box while suctioning a side surface of the box, a large load acts obliquely on the suction part, so that the article may be damaged.

SUMMARY OF THE INVENTION

Preferred embodiments of the present invention provide transfer devices that each safely transfer an article or articles having an upper surface that cannot be suctioned.

Hereinafter, preferred embodiments of the present invention will be described, and various features, characteristics, elements, etc. of the various preferred embodiments can be arbitrarily combined as needed.

A transfer device according to a preferred embodiment of the present invention is a device for transferring an article by moving the article in a front-rear direction, and includes a base portion, a support plate, a front-rear actuator, a suction device, and a vertical actuator.

The support plate is movable in the front-rear direction with respect to the base portion, and can support a bottom surface of the article.

The front-rear actuator actuates the support plate in the front-rear direction with respect to the base portion.

The suction device is provided on the base portion so as to be movable in the vertical direction, and can suction a side surface of the article.

The vertical actuator actuates the suction device at least in an ascending direction with respect to the base portion, and supports the suction device so as to be detachable from the suction device in a descending direction.

Here, regarding the "front-rear direction", a side close to the article is referred to as a front side, while a side away from the article is referred to as a rear side.

Hereinafter, an operation (depalletizing operation) of taking out one or a plurality of articles from stacked articles will be described as an example.

In such a transfer device, the suction device suctions a side surface of an article, and then the vertical actuator moves the suction device upward so as to lift the article. Next, the front-rear actuator moves the support plate frontward, and inserts the support plate below the article. Next, the entire transfer device is moved rearward while the front-rear actuator is moving the support plate frontward. Thus, the suction device and the article are pulled onto the support plate. Next, when the vertical actuator lowers the suction device downward, the suction device descends together with the article. When a lower surface of the article comes into contact with the support plate during the lowering operation of the suction device, the vertical actuator then moves away from the suction device, so that the article is finally placed on the transfer table.

In such a transfer device, the load of the article can be put on the support plate while the suction device is suctioning the article. Accordingly, a large load does not act on the suction device. As a result, the safety of the suction device is improved.

The vertical actuator may include a cylinder that pushes up the suction device, and a spring that urges the suction device downward.

In such a transfer device, when the piston of the cylinder descends, the piston is separated from the suction device on the way. Even in such a case, the article can be reliably placed on the support plate or on a predetermined position by causing the suction device to descend by the spring.

The front-rear actuator may be capable of moving the support plate to a rear side of the position of the suction device in the front-rear direction.

The vertical actuator may be capable of causing the suction device to descend to a position overlapping the support plate in the height direction.

In such a transfer device, since the suction device can descend to a position overlapping the support plate in the height direction, the suction device can also transfer an article having a small height while suctioning the article.

The vertical actuator may have a holding mechanism including a cam that fixes the suction device at a descending position so as to be not swingable and holds the suction device at an ascending position so as to be swingable.

In such a transfer device, by using the holding mechanism, the suction device can be switched between a swing locked state and a swing unlocked state by the ascending and descending operation of the suction device.

The transfer device may further include a contact provided on a lower surface of the suction device.

Hereinafter, an operation (palletizing operation) of stacking an article, a side surface of which is suctioned by the suction device of the transfer device and a lower surface of which is supported by the support plate, will be described as an example.

After the article is brought close to a predetermined position, the front-rear actuator moves the support plate rearward so as to pull out the support plate from below the article. Then, when the support plate is separated from the article while the article is being placed at the predetermined position, the suction device descends together with the article and abuts on the support plate. At this time, a member which actually abuts on the support plate is a contact. Accordingly, the contact defines and functions as a cushioning material, so that the suction device and the support plate are hardly damaged.

A transfer device according to a preferred embodiment of the present invention can safely transfer an article with an upper surface that cannot be suctioned.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

First Preferred Embodiment

Figure 1:
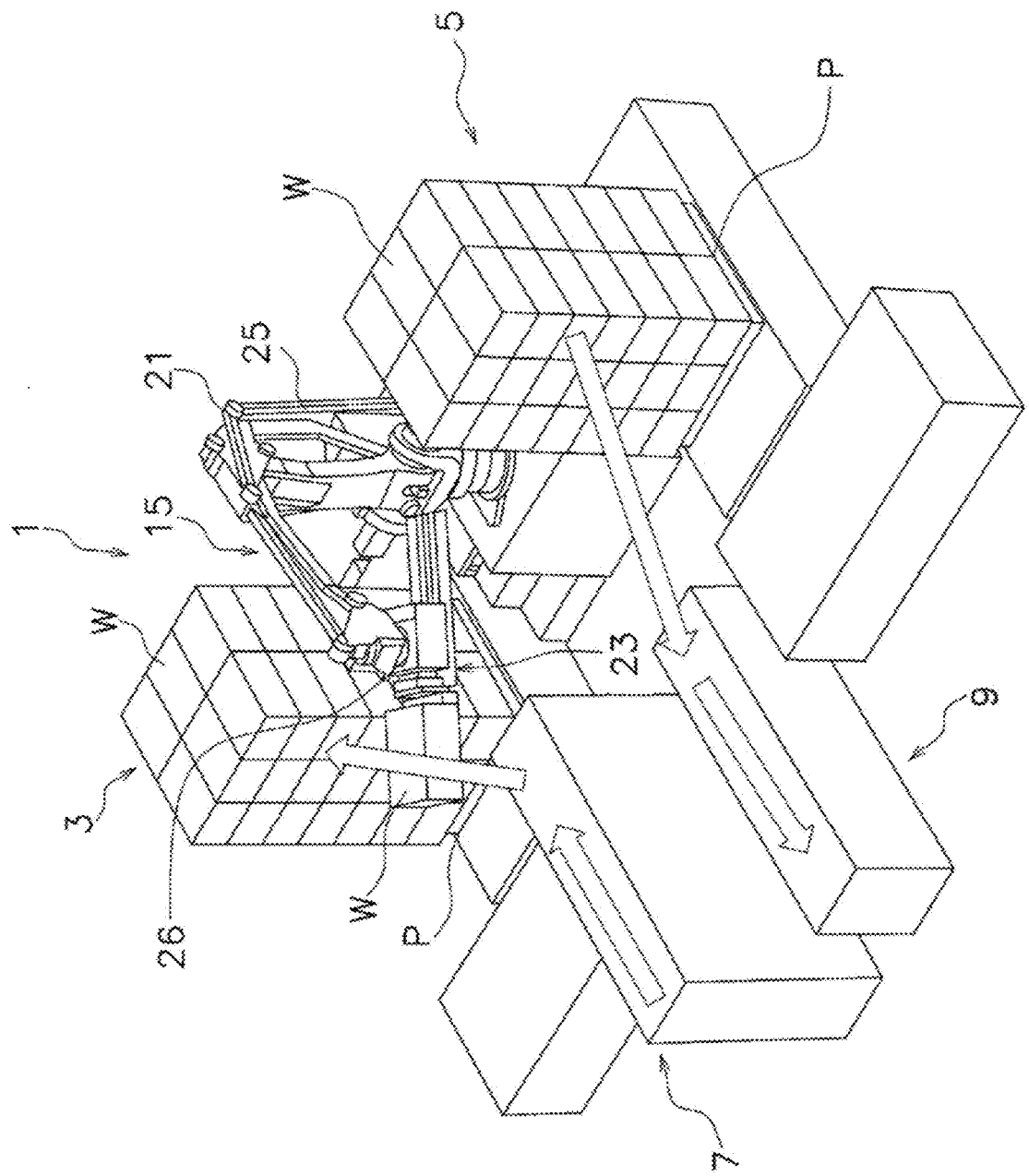
FIG. 1 is a schematic plan view of a picking system according to a first preferred embodiment of the present invention.

A picking system 1 will be described as a first preferred embodiment of the present invention with reference to FIG. 1. FIG. 1 is a schematic plan view of the picking system according to the first preferred embodiment.

The picking system 1 is a device for picking a requested article, and specifically performs an operation of stacking (palletizing) an article W on a pallet P, and an operation of taking out (depalletizing) an article W from stacked articles W.

The picking system 1 includes a palletizing section 3 and a depalletizing section 5. In the palletizing section 3, an article W is stacked. In the depalletizing section 5, an article W is taken out. Articles W are stacked on the pallet P, for example, so as to be aligned in a vertical direction, a front-rear direction, and a right-left direction.

The picking system 1 includes a carry-in conveyor device 7. The carry-in conveyor device 7 is a device that carries in an article W to a picking position.

The picking system 1 has a carry-out conveyor device 9. The carry-out conveyor device 9 is a device that carries out an article W from a picking position.

The carry-in conveyor device 7 and the carry-out conveyor device 9 are disposed adjacent to each other, extend in one horizontal direction, and are arranged in parallel or substantially in parallel.

The picking system 1 includes a picking robot 15 (an example of a transfer device). The picking robot 15 performs a palletizing operation and a depalletizing operation. The picking robot 15 is disposed between the palletizing section 3 and the depalletizing section 5.

The picking robot 15 includes a robot arm 21. The robot arm 21 functions based on a known technique.

The picking robot 15 includes a hand 23 (an example of a transfer device). The hand 23 transfers an article W by moving the article W in the front-rear direction (a direction in which a side close to the article W is referred to as a front side, while a side away from the article W is referred to as a rear side), and is mounted on a tip of the robot arm 21.

Figure 2:
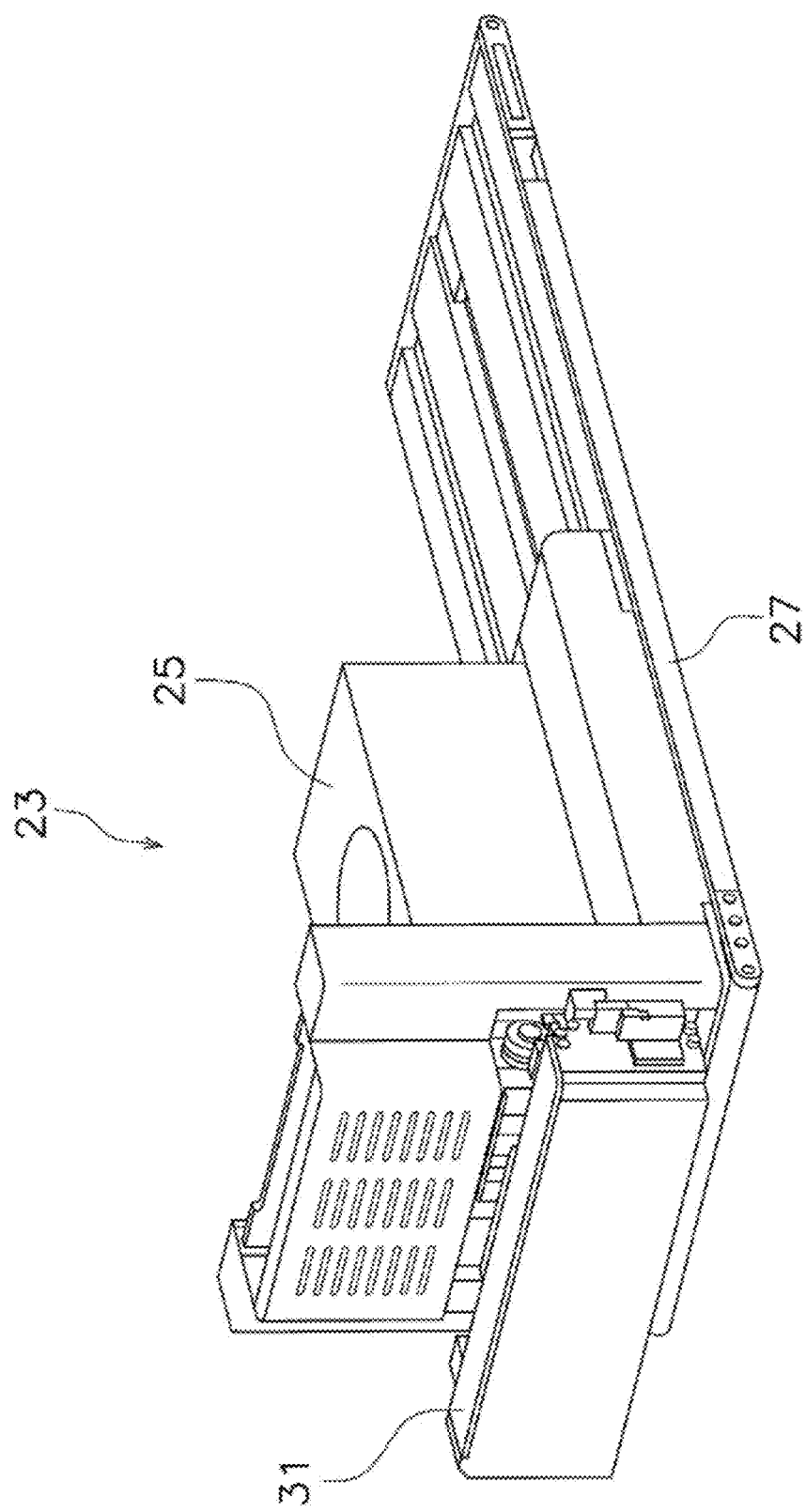
FIG. 2 is a perspective view of a hand viewed obliquely from above.
Figure 3:
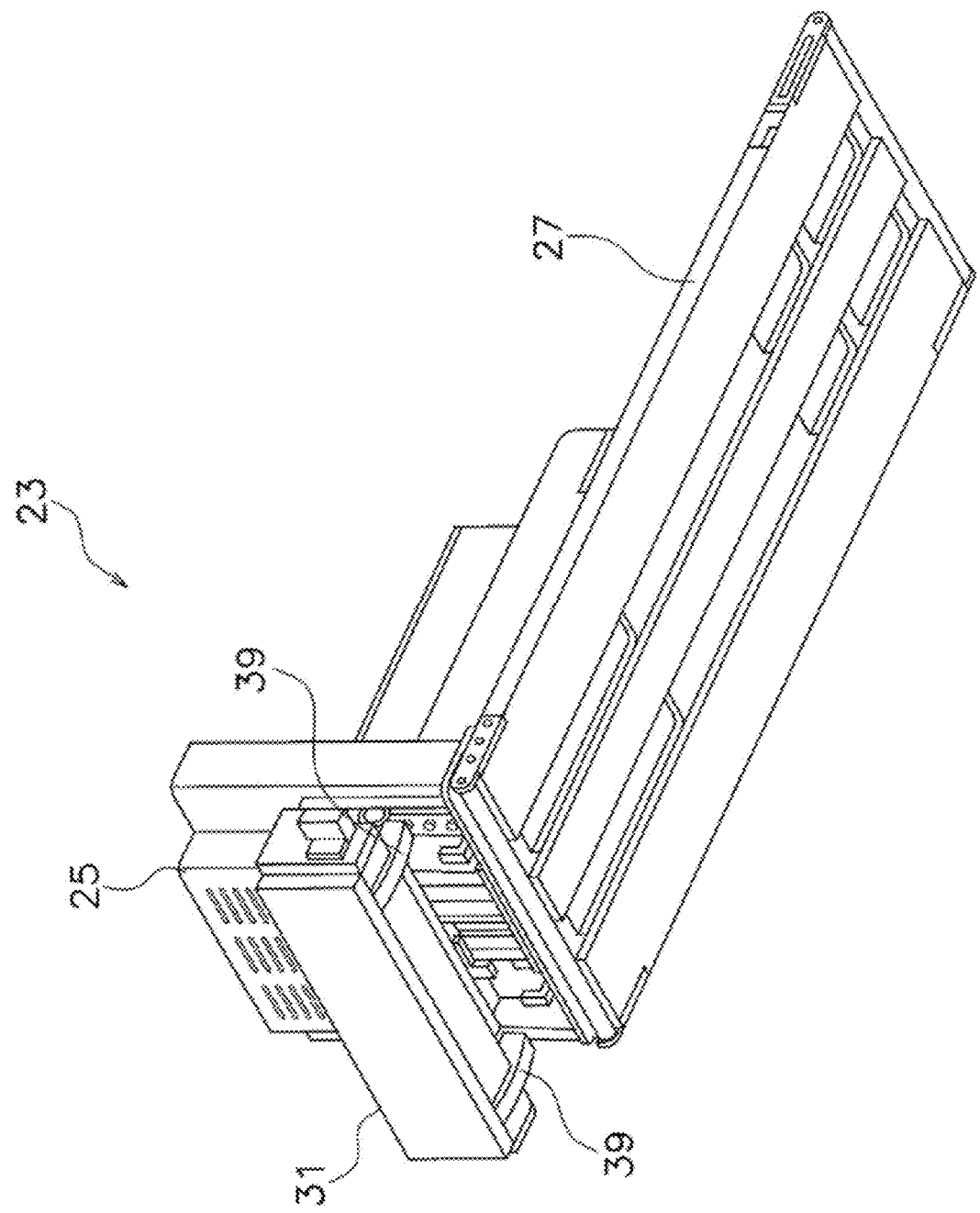
FIG. 3 is a perspective view of a hand viewed obliquely from below.
Figure 4:
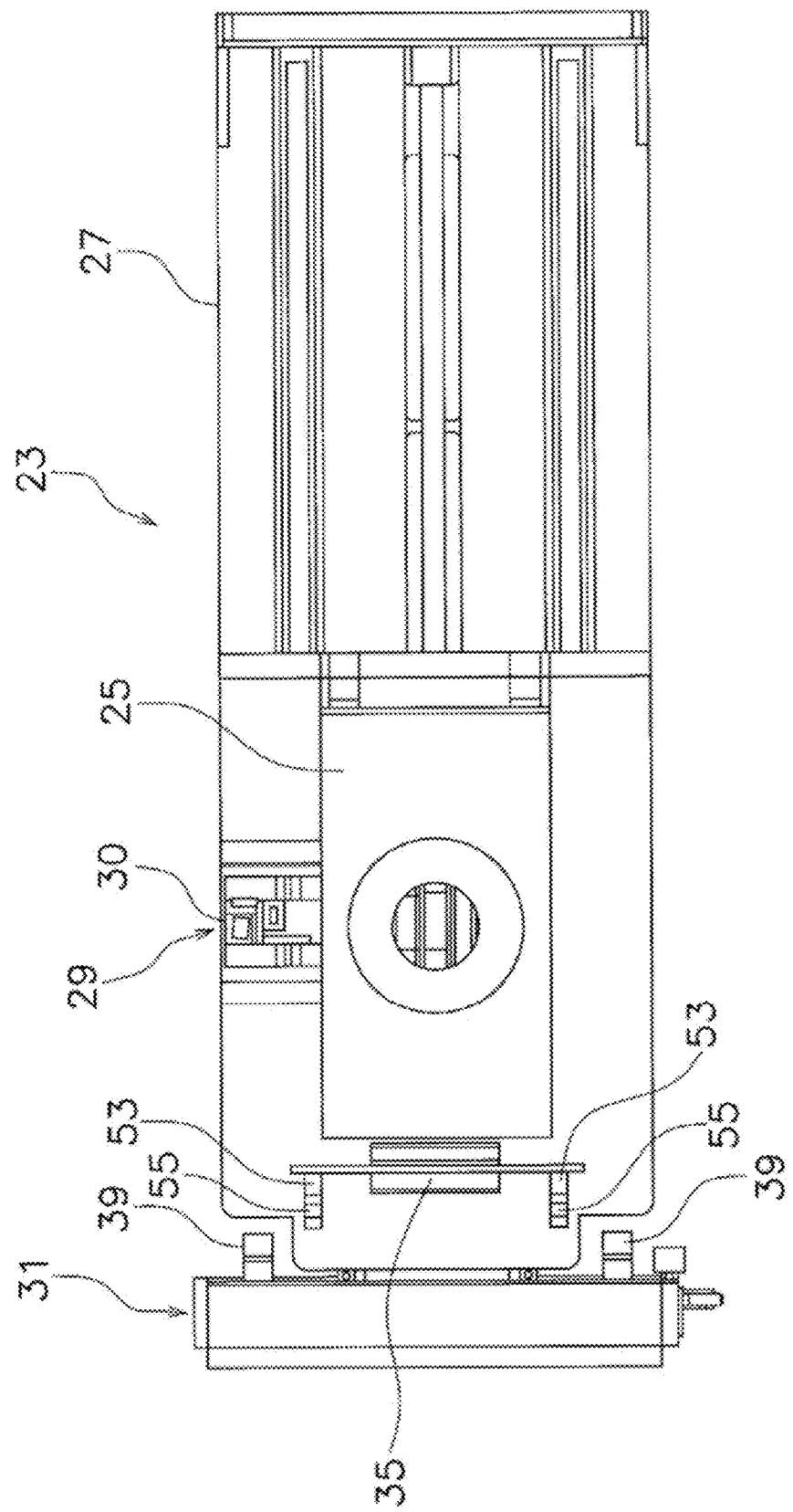
FIG. 4 is a plan view of a hand.
Figure 5:
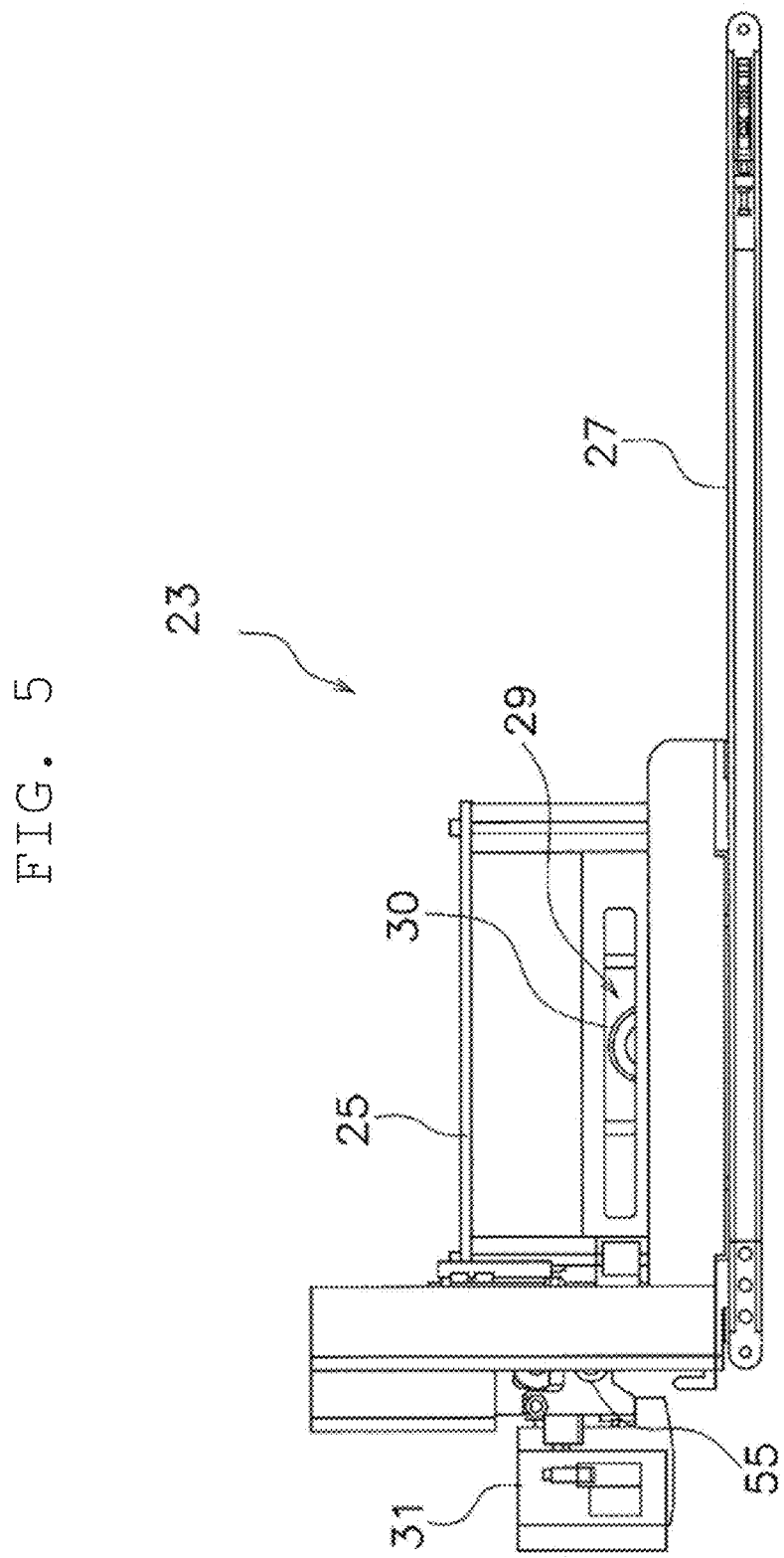
FIG. 5 is a side view of a hand.

The hand 23 will be described with reference to FIGS. 2 to 5. FIG. 2 is a perspective view of the hand viewed obliquely from above. FIG. 3 is a perspective view of the hand viewed obliquely from below. FIG. 4 is a plan view of the hand. FIG. 5 is a side view of the hand.

The hand 23 includes a hand base 25. The hand base 25 is coupled to an arm tip lower portion of the robot arm 21 so as to be freely rotatable. The hand 23 is slewed with respect to the robot arm 21 by a slewing mechanism 26 (FIG. 1).

The hand 23 includes a transfer table 27. The transfer table 27 is provided on a lower surface of the hand base 25 so as to be movable in the front-rear direction, and can support a bottom surface of an article W. Specifically, the transfer table 27 is supported so as to be movable with respect to a guide section (not illustrated) located on a lower surface of the hand base 25. The transfer table 27 has a rectangular or substantially rectangular shape that is longer in the front-rear direction than the hand base 25, and can protrude to any side in the front-rear direction of the hand base 25.

The hand 23 includes a transfer table actuator 29 (an example of a front-rear actuator) as illustrated in FIGS. 4 and 5. The transfer table actuator 29 is a device that actuates the transfer table 27 in the front-rear direction with respect to the hand base 25.

The transfer table actuator 29 includes a motor 30 provided on the hand 23, a plurality of pulleys (not illustrated) provided on the transfer table 27, and a belt (not illustrated)

hung from the pulleys. The transfer table actuator may be a chain mechanism, a rack and pinion mechanism, an electric cylinder, or an air cylinder.

It is to be noted that the transfer table actuator 29 can move the transfer table 27 between a first position (e.g., FIG. 7) in which the front end is on the front side of a suction device (described later) in the front-rear direction, and a second position (e.g., FIG. 2) in which the front end is on the rear side of the suction device 31 in the front-rear direction.

Figure 6:
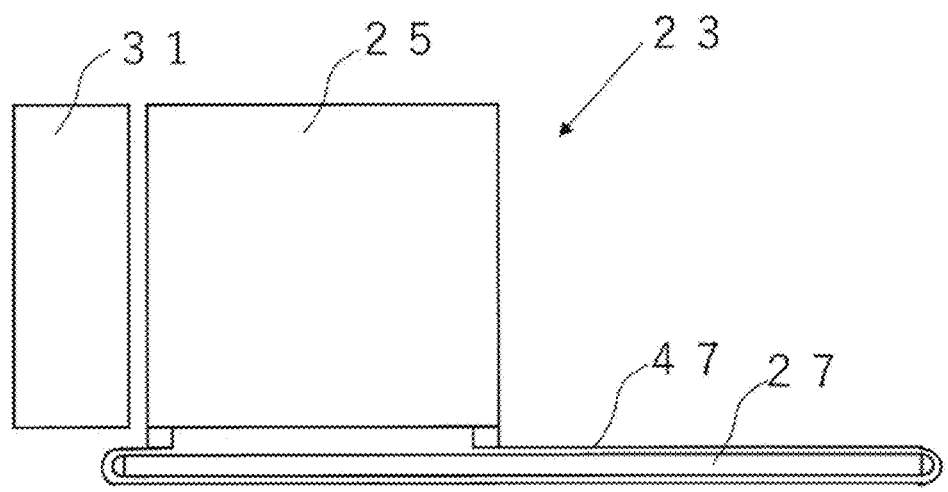
FIG. 6 is a schematic side view of a hand.
Figure 7:
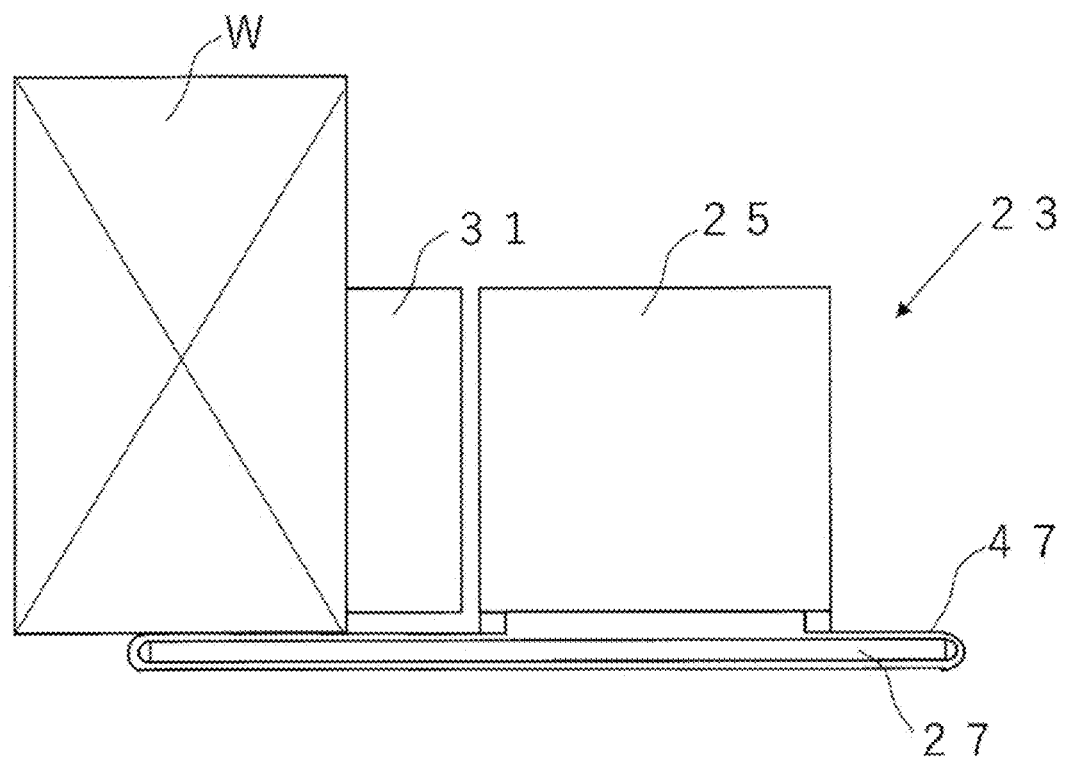
FIG. 7 is a schematic side view of a hand.

The structure of the transfer table 27 will be described with reference to FIGS. 6 and 7. FIG. 6 is a schematic side view of the hand. FIG. 7 is a schematic side view of the hand.

A slide belt 47 is wound around the transfer table 27. Both ends of the slide belt 47 are fixed to a lower portion of the hand base 25, and cover and are wound around upper and lower surfaces on both sides of the transfer table 27. When the transfer table 27 moves in the front-rear direction with respect to the hand base 25, the slide belt 47 is deformed along the moving position of the transfer table. Accordingly, in the process of transferring an article W to the transfer table 27, a portion of the slide belt 47 that comes into contact with the article W is moved in the front-rear direction with respect to the transfer table 27 together with the article when a load in the front-rear direction acts on the slide belt 47 from the article W. That is, although the slide belt 47 slides with respect to the transfer table 27, the article W is pulled onto the transfer table 27 without sliding with the slide belt 47. Accordingly, the article W is hardly damaged.

Figure 11:
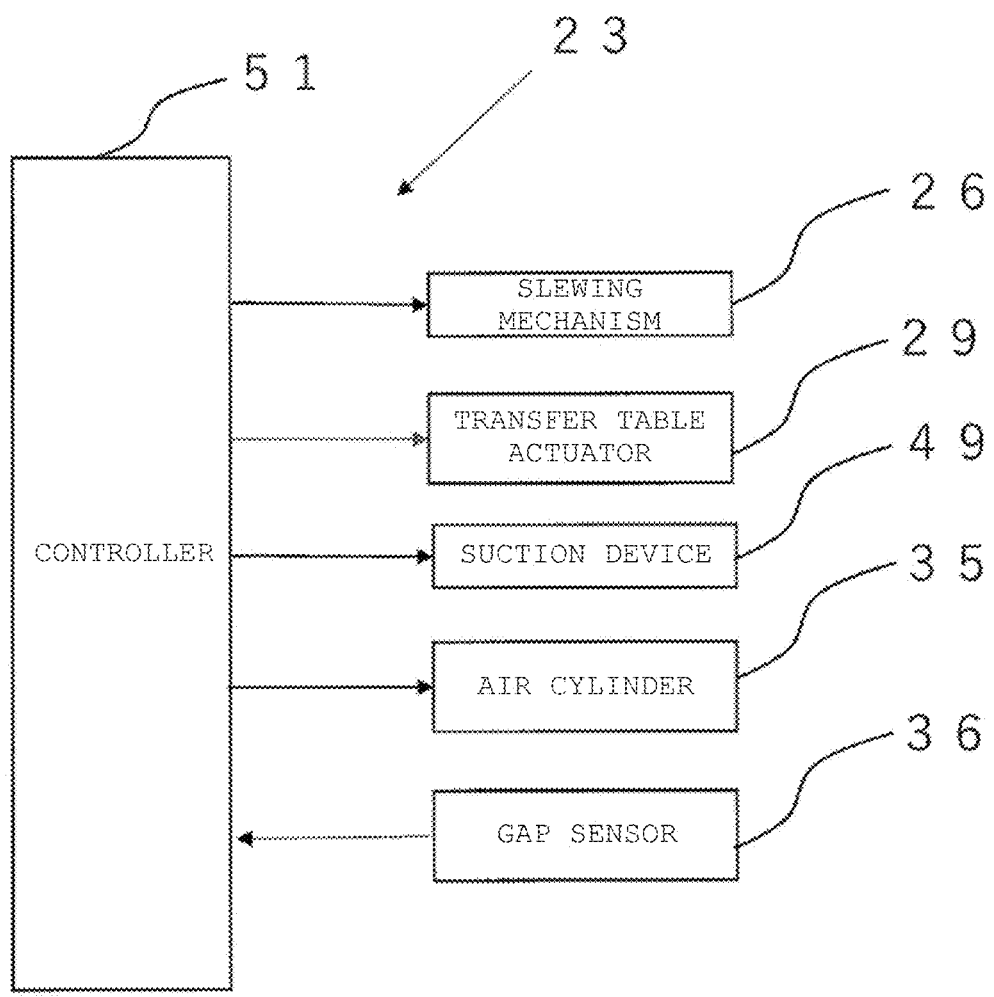
FIG. 11 is a block diagram illustrating a control configuration of a hand.

The hand 23 includes the suction device 31 (an example of a suction device). The suction device 31 is provided on the hand base 25 so as to be movable in the vertical direction, and can suction a side surface of the article W. Suction by the suction device 31 is started and stopped by a suction device 49 (FIG. 11). The suction device 31 includes a suction pad 31*a* that actually abuts on the article W.

Figure 8:
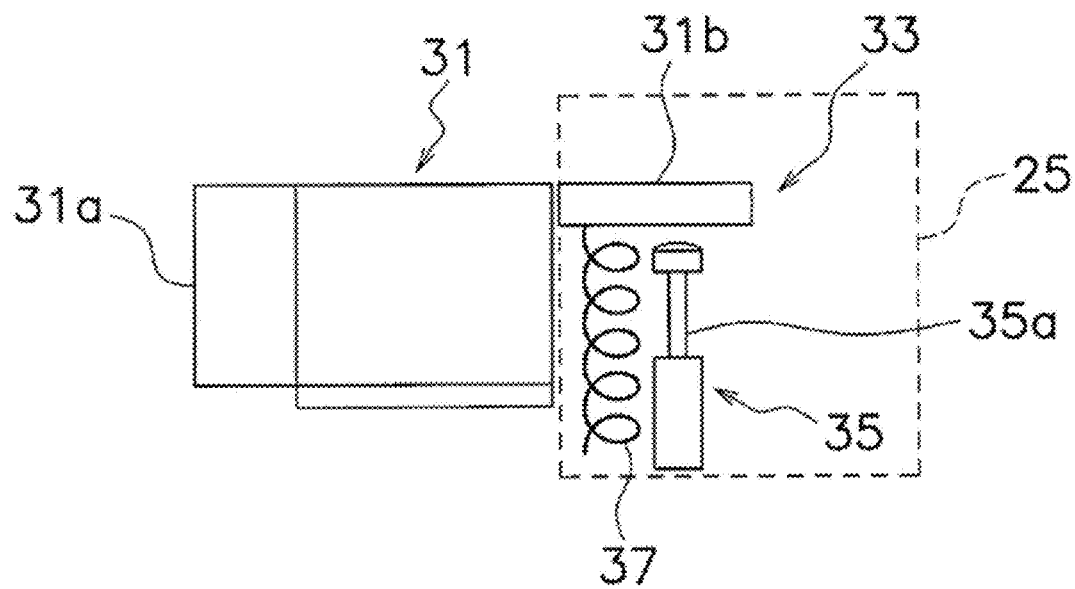
FIG. 8 is a schematic view illustrating the relationship between a hand base of a hand and a vertical actuator.

The hand 23 will be further described with reference to FIG. 8. FIG. 8 is a schematic view illustrating the relationship between the hand base of the hand and the vertical actuator.

The hand 23 includes a vertical actuator 33 (an example of a vertical actuator). The vertical actuator 33 and the suction device 31 are moved vertically with respect to the hand base 25.

The vertical actuator 33 includes an air cylinder 35. The air cylinder 35 actuates the suction device 31 in an ascending direction with respect to the hand base 25. The air cylinder 35 is detachable from the suction device 31 in a descending direction. The air cylinder 35 includes a piston 35*a*, and the piston 35*a* can abut on a receiving portion 31*b* of the suction device 31 from below to push up the suction device 31. The air cylinder 35 is disposed in the middle of the hand base 25 near the suction device 31 in the width direction as illustrated in FIG. 4.

The vertical actuator 33 includes a spring 37 that urges the suction device 31 downward. Specifically, one end of the spring 37 is fixed to the hand base 25, and the other end is fixed to the suction device 31, so that the suction device 31 is pulled downward with respect to the hand base 25. By utilizing the spring 37, the article W can be reliably caused to descend and placed on the transfer table 27 (described later) even after the air cylinder 35 is separated downward from the suction device 31. Springs 37 are disposed, for example, at two locations on both outer sides in the width direction of the hand base 25 near the suction device 31. Although the spring 37 is disposed near the air cylinder 35 in FIG. 8, this is only a schematic illustration and does not limit the actual arrangement. Moreover, a member to which the spring 37 is fixed is not particularly limited. More specifically, it is to be noted that the suction device 31 continues to follow the piston 35*a* by being pulled by its own weight and by the spring 37 when the piston 35*a* of the air cylinder 35 is lowered downward, and the downward movement stops when the article W is placed on a lower device or another article. Thereafter, the piston 35*a* is separated from the suction device 31.

Figure 12:
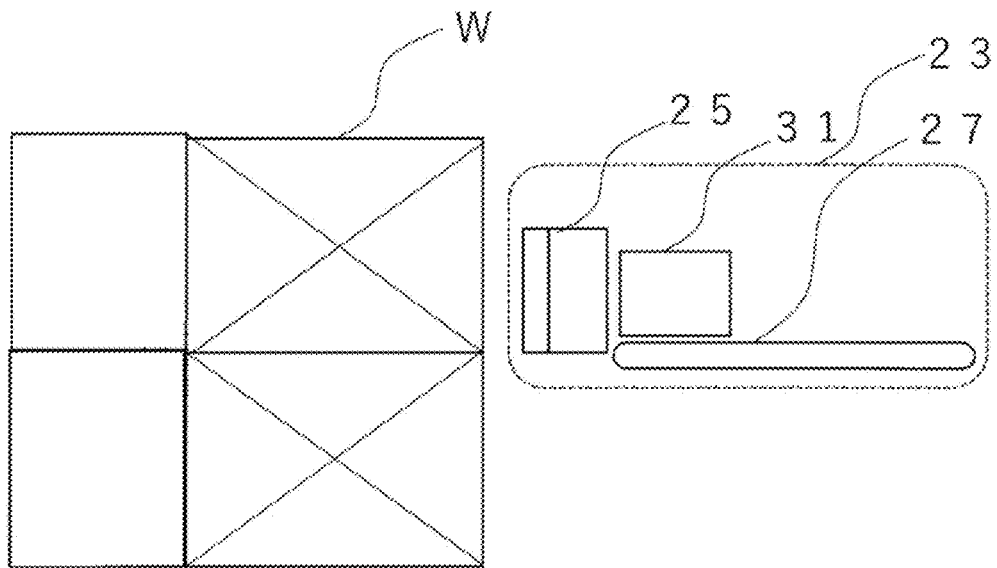
FIG. 12 is a schematic view illustrating one state of a depalletizing operation by a hand.

The vertical actuator 33 can cause the suction device 31 to descend to a position overlapping the transfer table 27 in the height direction (see FIG. 12). At this time, the transfer table is located on the rear side (the above-described second position) of the suction device 31 in the front-rear direction. Accordingly, an article W having a small height can also be picked. This is possible because the suction device 31 is located at the lowest position with respect to the hand base 25 and the transfer table 27 when the air cylinder 35 is in the most contracted state, so that a lower surface of the suction device 31 is located at a position lower than an upper surface of the transfer table 27. Here, the above structure is not essential.

The hand 23 further includes contacts 39 on a lower surface of the suction device 31. The contacts 39 are partially provided on a lower surface of the suction device 31. The contacts are made of an elastic such as rubber. Specifically, the contacts 39 are provided near both outer ends in the width direction of the suction device 31, and each have a band shape extending in the front-rear direction as illustrated in FIG. 3. The shape, number, position, and material of the contacts are not particularly limited. Moreover, the contacts may be omitted.

The hand 23 includes a suction device holding mechanism (hereinafter, referred to as a holding mechanism 43). The holding mechanism 43 fixes the suction device 31 so as to be not swingable at a descending position, and also holds the suction device 31 so as to be swingable at an ascending position.

Figure 9:
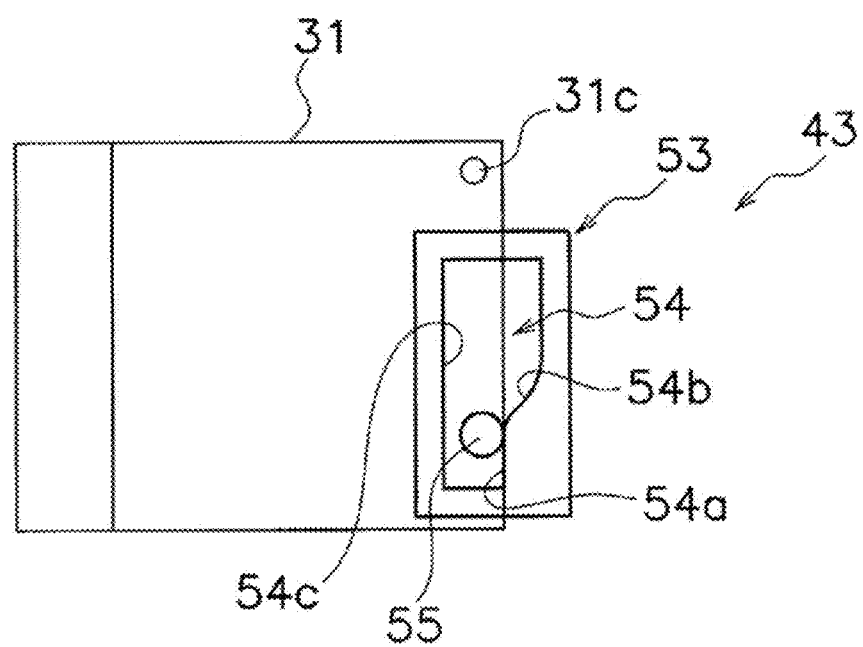
FIG. 9 is a schematic view of a holding mechanism.
Figure 10:
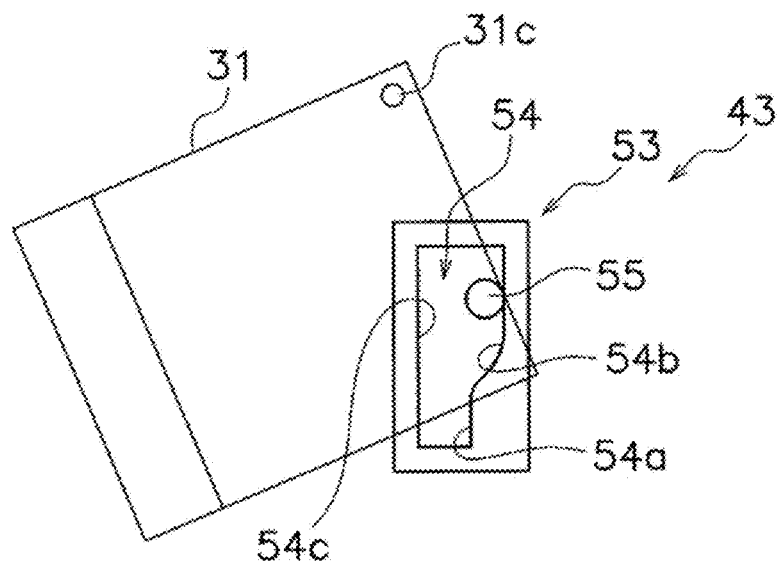
FIG. 10 is a schematic view of a holding mechanism.

The holding mechanism 43 will be specifically described with reference to FIGS. 9 and 10. FIGS. 9 and 10 are schematic views of the holding mechanism.

The holding mechanism 43 includes a cam 53 and a roller 55. The cam 53 is fixed to the main body of the hand base 25. The cam 53 includes a hollow portion 54 to support the roller 55. The hollow portion 54 includes a locking surface 54*a* that extends linearly in the vertical direction at a lower portion of a side surface on the suction device 31 side. The hollow portion 54 further includes a curved surface 54*b*, which is continuous with the locking surface 54*a* and smoothly curves, on a side surface on the suction device 31 side. The curved surface 54*b* is recessed rearward from the locking surface 54*a* in the front-rear direction. The hollow portion 54 includes a second locking surface 54*c* facing the locking surface 54*a* and the curved surface 54*b*. The second locking surface 54*c* extends vertically. The cams 53 are disposed, for example, at two locations of the hand base 25 on both outer sides in the width direction near the suction device 31.

The roller 55 is provided on the cam 53 side of a lower portion of the suction device 31 so as to be rotatable. The rotation axis of the roller 55 is parallel or substantially parallel to the width direction of the hand 23. The roller 55 abuts on or is close to the locking surface 54*a* and the curved surface 54*b* of the cam 53.

The suction device 31 includes a fulcrum 31*c*, which is the center of rotation, on the upper cam 53 side. The rotation axis of the fulcrum 31*c* is parallel or substantially parallel to the width direction of the hand 23. The fulcrum 31c is, for example, a pin, and the pin is guided so as to be freely movable in a vertically extending elongated hole (not illustrated) at a plate (not illustrated) of the hand base 25.

A stopper (not illustrated) makes the suction device 31 unable to rotate clockwise from the state of FIG. 9. That is, the suction device 31 is freely rotatable with respect to the hand base 25 only counterclockwise from the state of FIG. 9.

When the suction device 31 is located at a lower position as illustrated in FIG. 9, the roller 55 abuts on the locking surface 54a of the cam 53, so that the suction device 31 cannot rotate counterclockwise.

When the suction device 31 ascends as illustrated in FIG. 10, the roller 55 slides on the curved surface 54b of the cam 53, so that the suction device 31 can be inclined with respect to the hand base 25 in accordance with the posture of the article W. When the suction device 31 attempts to rotate clockwise in such a state, rotation of the suction device 31 is restricted by the roller 55 abutting on the second locking surface 54c.

As described above, by using the cam 53, the suction device 31 can be switched between a swing locked state and a swing unlocked state by the ascending and descending operation of the suction device 31.

The control configuration of the hand 23 will be described with reference to FIG. 11. FIG. 11 is a block diagram illustrating the control configuration of the hand.

The hand 23 includes a controller 51.

The controller 51 preferably includes a computer system having a processor (e.g., CPU), a storage device (e.g., ROM, RAM, HDD, SSD, etc.), and various interfaces (e.g., A/D converter, D/A converter, communication interface, etc.). The controller 51 performs various control operations by executing a program stored in a storage (corresponding to a portion or all of the storage area of the storage device).

The controller 51 may include a single processor, or may include a plurality of independent processors for respective controls.

A portion or an entirety of the function of each element of the controller 51 may be realized as a program executable by a computer system of the controller 51. In addition, a portion of the function of each element of the controller 51 may be constituted of a custom IC.

The controller 51 controls the slewing mechanism 26, the transfer table actuator 29, the suction device 49, and the air cylinder 35.

A detection signal from a gap sensor 36 is transmitted to the controller 51.

Although not illustrated, the controller 51 is connected with a sensor to detect the size, shape, and position of the article W, a sensor and a switch to detect the state of each device, and an information input device.

An operation (depalletizing operation) of taking out one or a plurality of articles W from stacked articles W will be described with reference to FIGS. 12 to 17. FIGS. 12 to 17 are schematic views each illustrating one state of the depalletizing operation by the hand.

As illustrated in FIG. 12, the hand 23 is moved to a position corresponding to a target article W.

Figure 13:
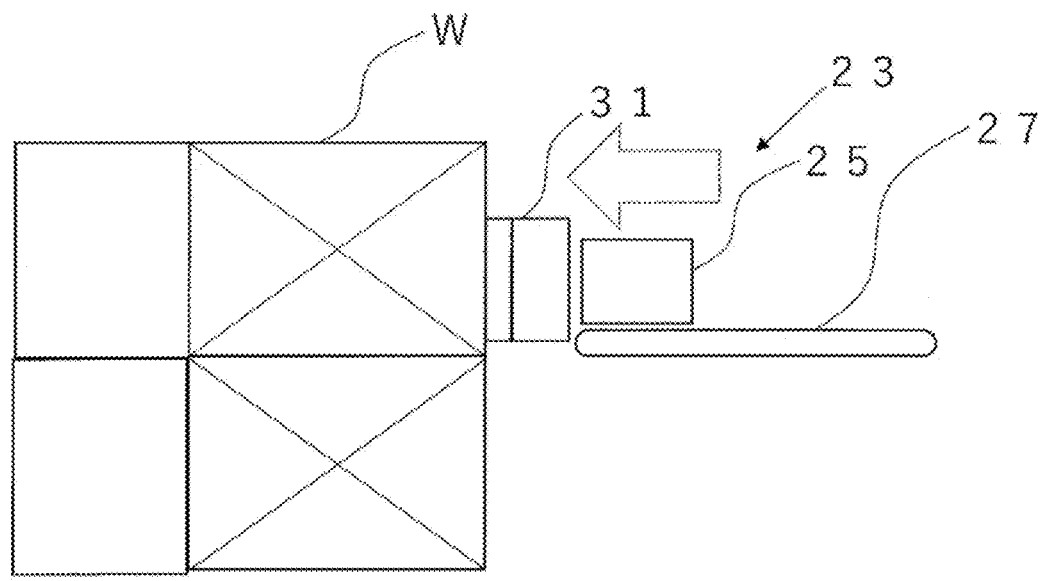
FIG. 13 is a schematic view illustrating one state of a depalletizing operation by a hand.

As illustrated in FIG. 13, the suction device 31 is put into contact with an article W and suctions the article W on the basis of a lower position of the article W. Specifically, immediately before the suction device 31 comes into contact with the article W, the suction device 49 starts suction, and the robot arm 21 moves the entire hand 23 to press the suction device 31 against the article W side.

Figure 14:
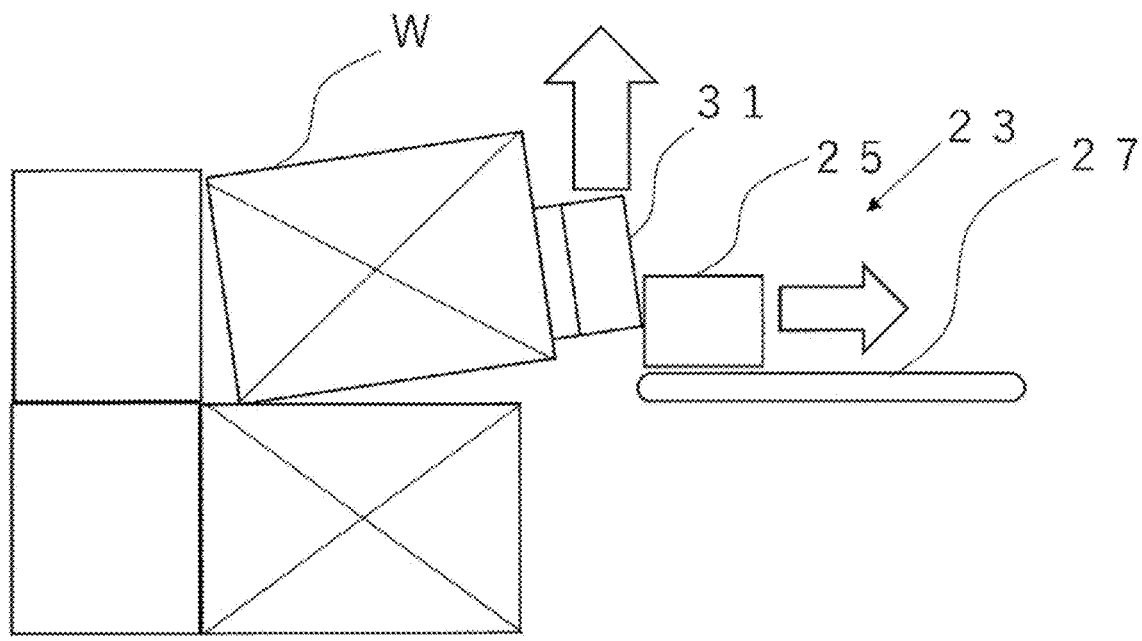
FIG. 14 is a schematic view illustrating one state of a depalletizing operation by a hand.

As illustrated in FIG. 14, the suction device 31 ascends with respect to the hand base 25 to lift the article W. Specifically, the air cylinder 35 causes the suction device 31 to ascend with respect to the hand base 25. It is to be noted that the robot arm 21 pulls the entire hand 23 rearward at the same time when the air cylinder 35 starts to cause the article W to ascend. Accordingly, the article W is lifted by the suction device 31 and is inclined together with the suction device 31.

Figure 15:
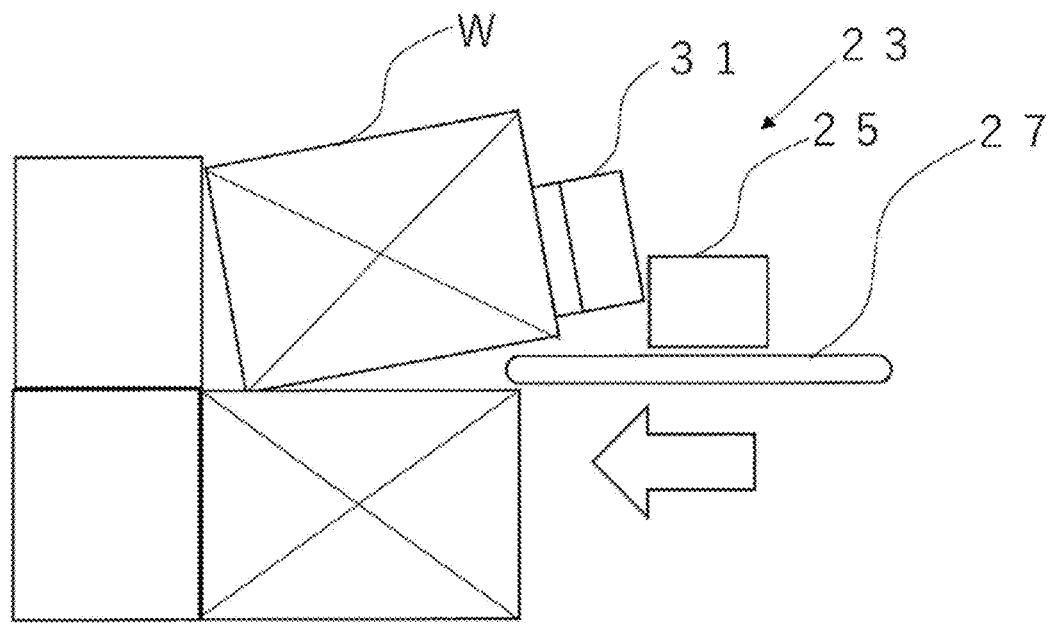
FIG. 15 is a schematic view illustrating one state of a depalletizing operation by a hand.

After the article W ascends, gap detection is performed by the gap sensor 36. When it is determined that there is enough space for the transfer table 27, the transfer table actuator 29 moves the transfer table 27 frontward, and inserts the transfer table 27 into a gap below the article W. When the transfer table further advances, the transfer table 27 slightly comes into contact with a bottom surface of the article W as illustrated in FIG. 15.

Figure 16:
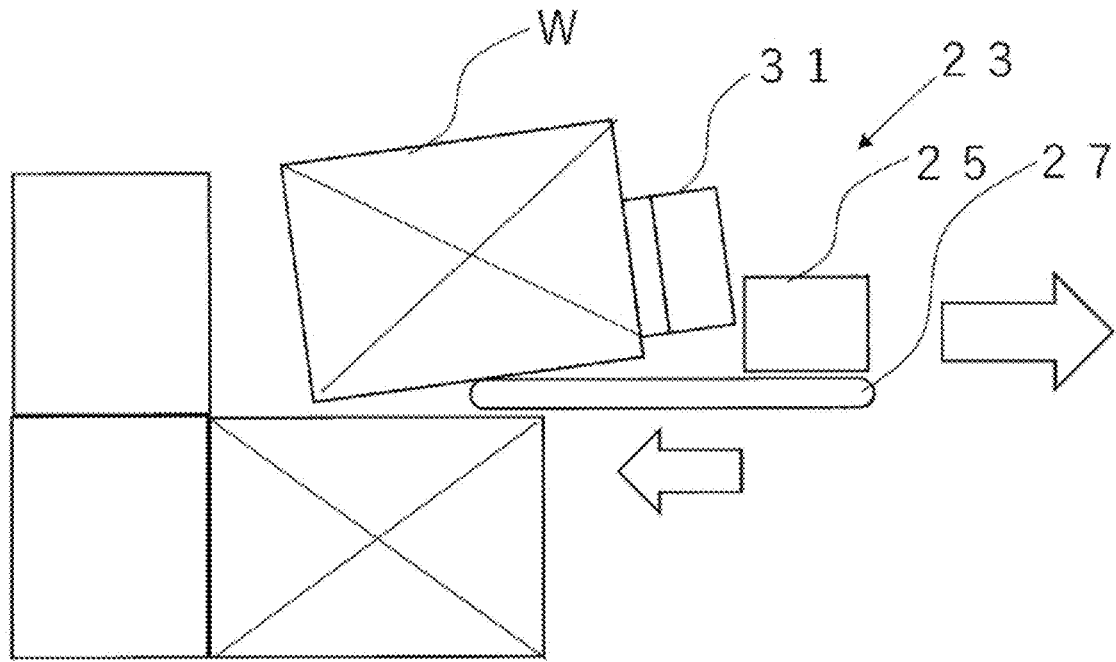
FIG. 16 is a schematic view illustrating one state of a depalletizing operation by a hand.

As illustrated in FIG. 16, the robot arm 21 pulls the entire hand 23 rearward (at this time, the position of the transfer table 27 in the front-rear direction does not change) while the transfer table actuator 29 is moving the transfer table 27 frontward. Thus, the suction device 31 and the article W are pulled onto the transfer table 27.

Figure 17:
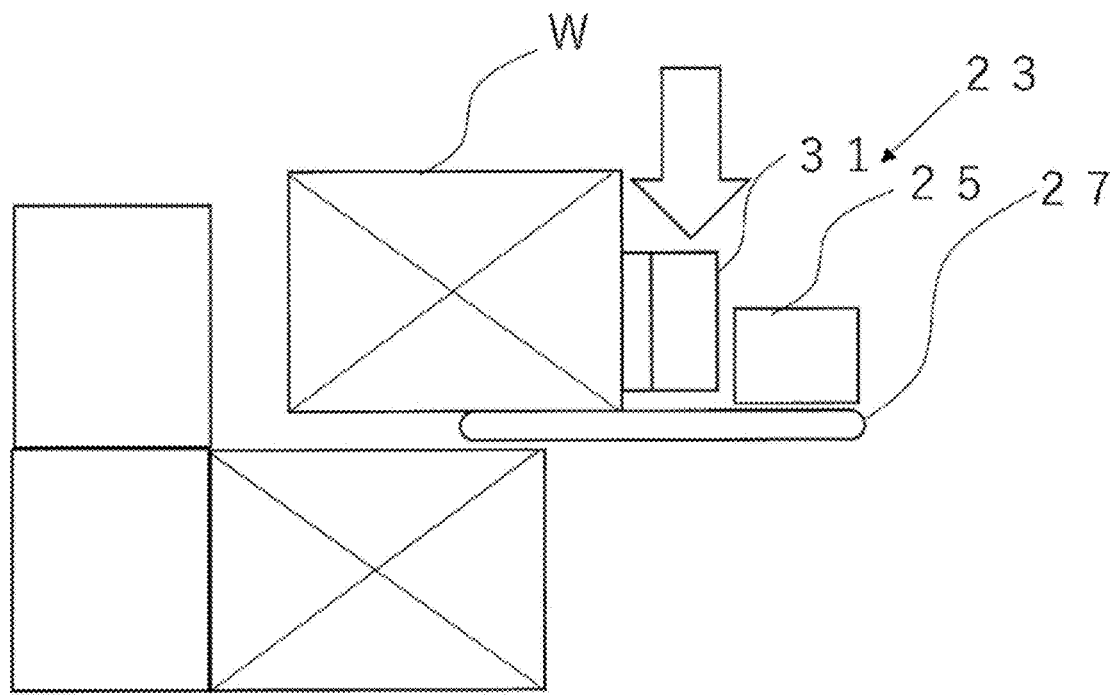
FIG. 17 is a schematic view illustrating one state of a depalletizing operation by a hand.

As illustrated in FIG. 17, the air cylinder 35 lowers the suction device 31 downward. Specifically, the piston 35a descends. Then, when the piston 35a of the air cylinder 35 is separated downward from the suction device 31, the suction device 31 also descends together with the article W. At this time, the suction device 31 is caused to reliably descend by the urging force of the spring 37 in addition to the own weight of the suction device 31 and the article W. As a result, the article W is placed on the transfer table 27.

As is clear from the above description, it is possible with such a hand 23 to put the load of the article W on the transfer table 27 while the suction device 31 is suctioning the article W. Accordingly, a large load does not act on the suction device 31. As a result, the safety of the hand 23 is improved.

With reference to FIGS. 18 to 21, an operation (palletizing operation) of stacking an article W, a side surface of which is suctioned by the suction device 31 of the hand 23 and a lower surface of which is supported by the transfer table 27, will be described. FIGS. 18 to 21 are schematic views each illustrating one state of the palletizing operation by the hand.

Figure 18:
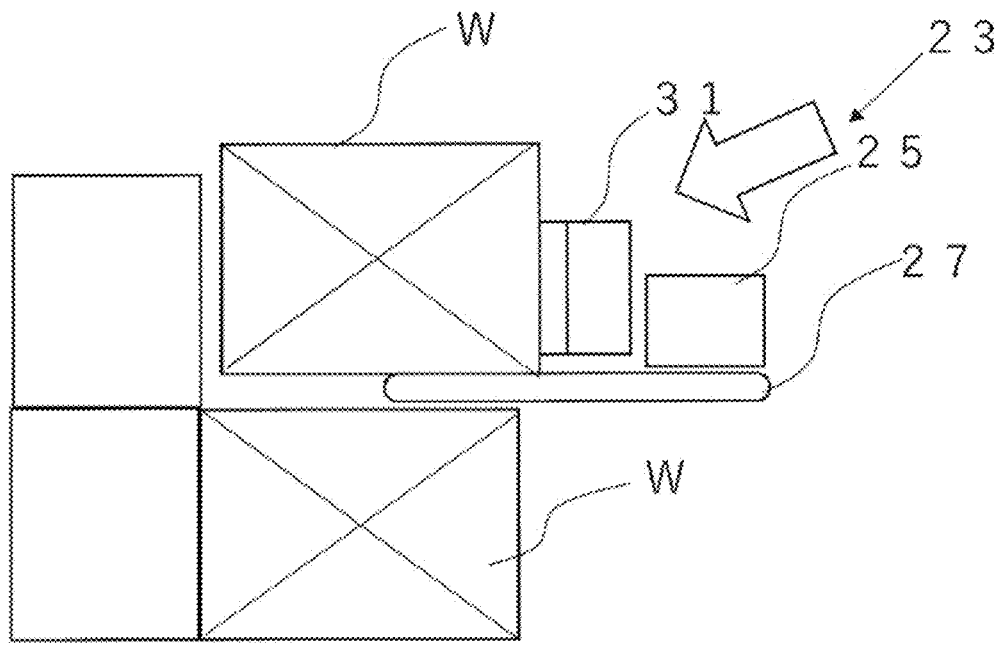
FIG. 18 is a schematic view illustrating one state of a palletizing operation by a hand.

As illustrated in FIG. 18, the hand 23 moves to bring the article W close to a predetermined position. At this time, the suction device 31 is in a state of having descended halfway in accordance with the article W. Although the article W is moved to a position above a predetermined position, a gap is left between the article W and another article W on a rear side. Moreover, there is a gap between the transfer table 27 and an article W on a lower side.

Figure 19:
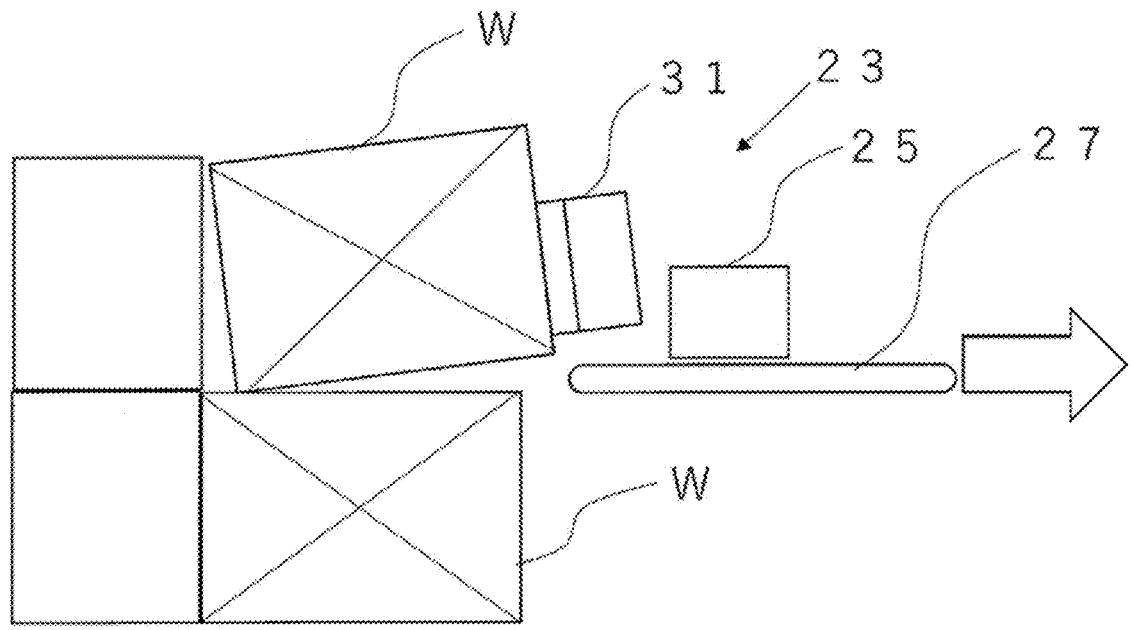
FIG. 19 is a schematic view illustrating one state of a palletizing operation by a hand.

As illustrated in FIG. 19, the transfer table actuator 29 moves the transfer table 27 rearward so as to pull the transfer table 27 out from below the article W. At this time, the article W and the suction device 31 are both inclined. After a corner of the article W abuts on the article W on the lower side, the suction device 31 descends. Then, the suction device 31 is placed on an upper surface of the transfer table 27 (the next state of FIG. 19, not illustrated in FIG. 19).

Figure 20:
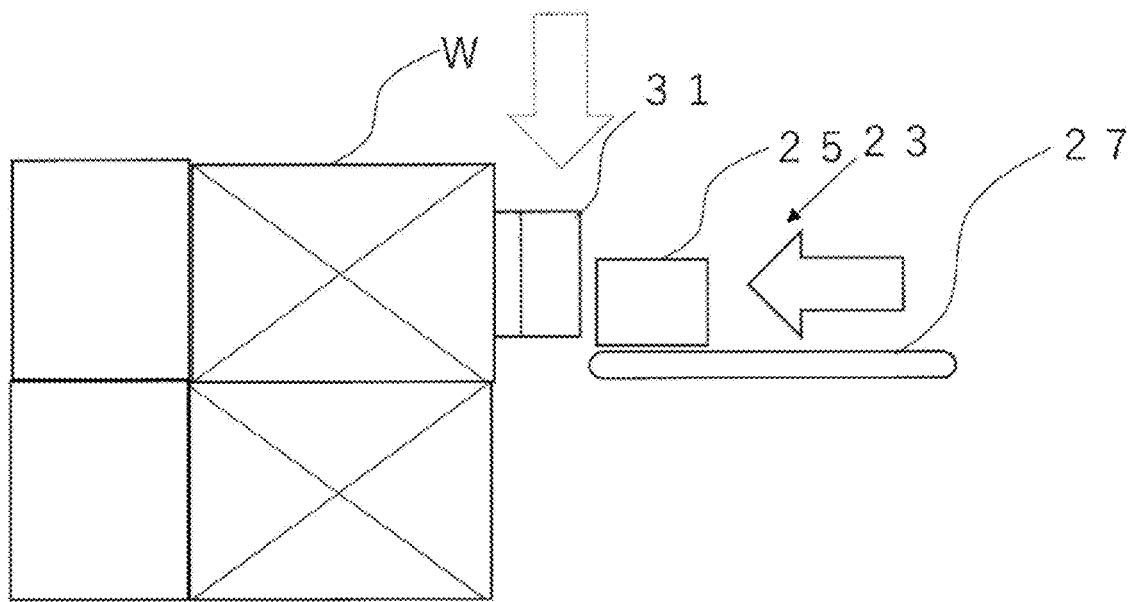
FIG. 20 is a schematic view illustrating one state of a palletizing operation by a hand.

As illustrated in FIG. 20, the transfer table 27 is moved rearward and is separated rearward from the suction device 31. Then, the suction device 31 descends because the transfer table 27 moves rearward and comes off. At this time, the entire hand 23 is slightly moved frontward by the robot arm 21. Thus, the gap between the article W to be transferred and an article W on a rear side when the article W to be transferred is placed obliquely is filled. It is to be noted that an absorber may be provided to suppress or prevent the impact of descending of the suction device 31.

Figure 21:
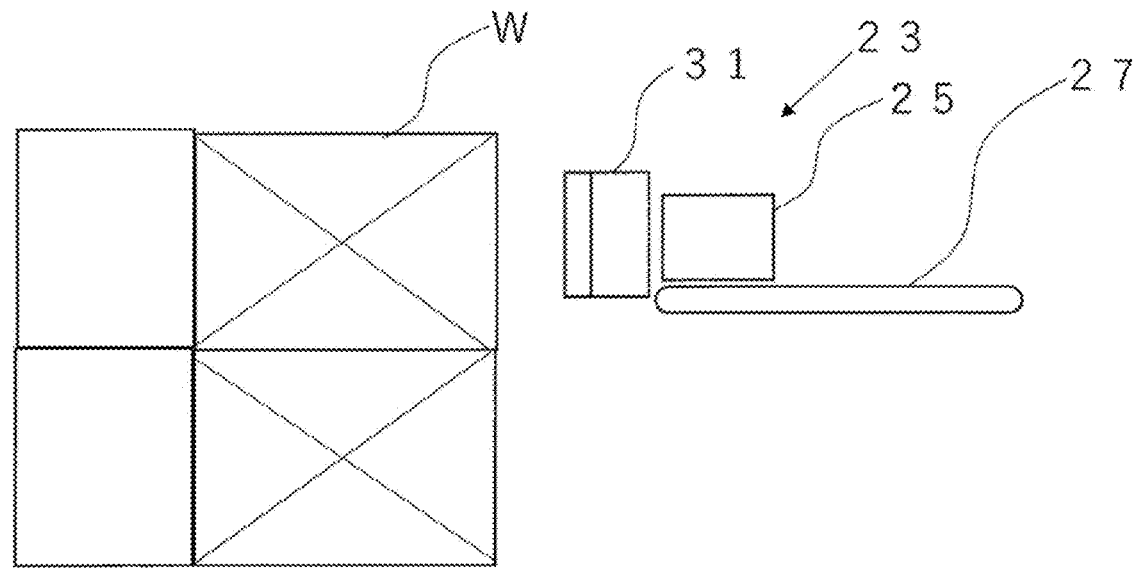
FIG. 21 is a schematic view illustrating one state of a palletizing operation by a hand.

When the article W is placed on an article W on the lower side as illustrated in FIG. 21, the suction device 49 stops the suction of the article W by the suction device 31. Moreover, the robot arm 21 moves the entire hand 23 rearward.

Figure 22:
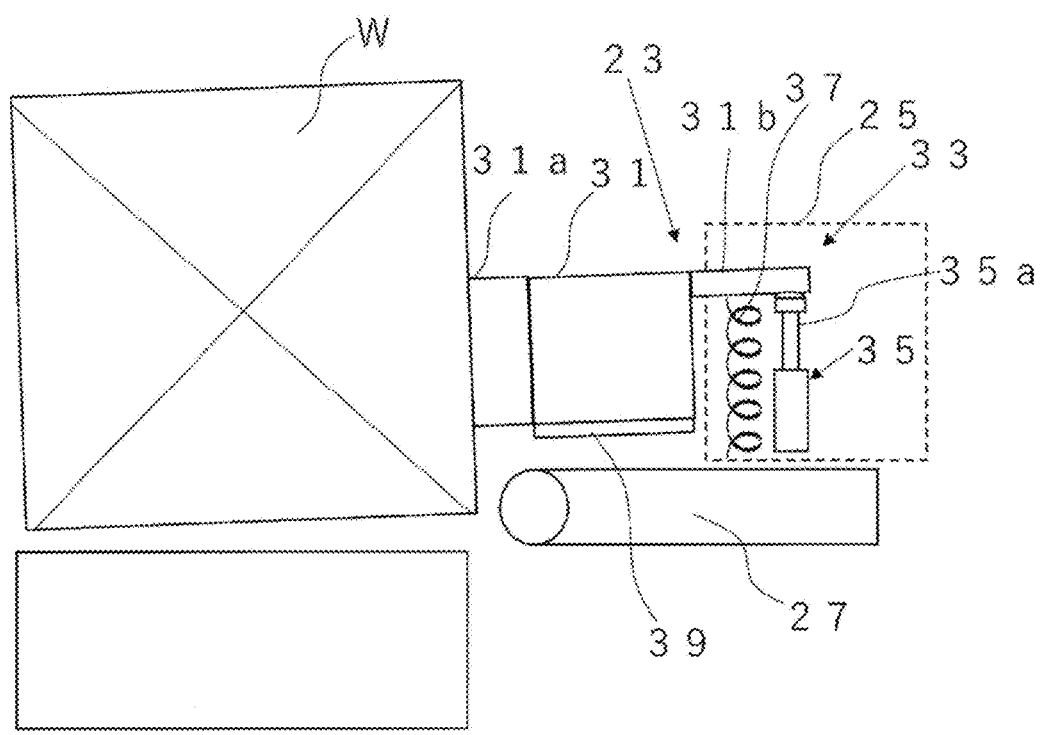
FIG. 22 is a schematic view for explaining operations of a cylinder, a spring, and a contact in a palletizing operation.
Figure 23:
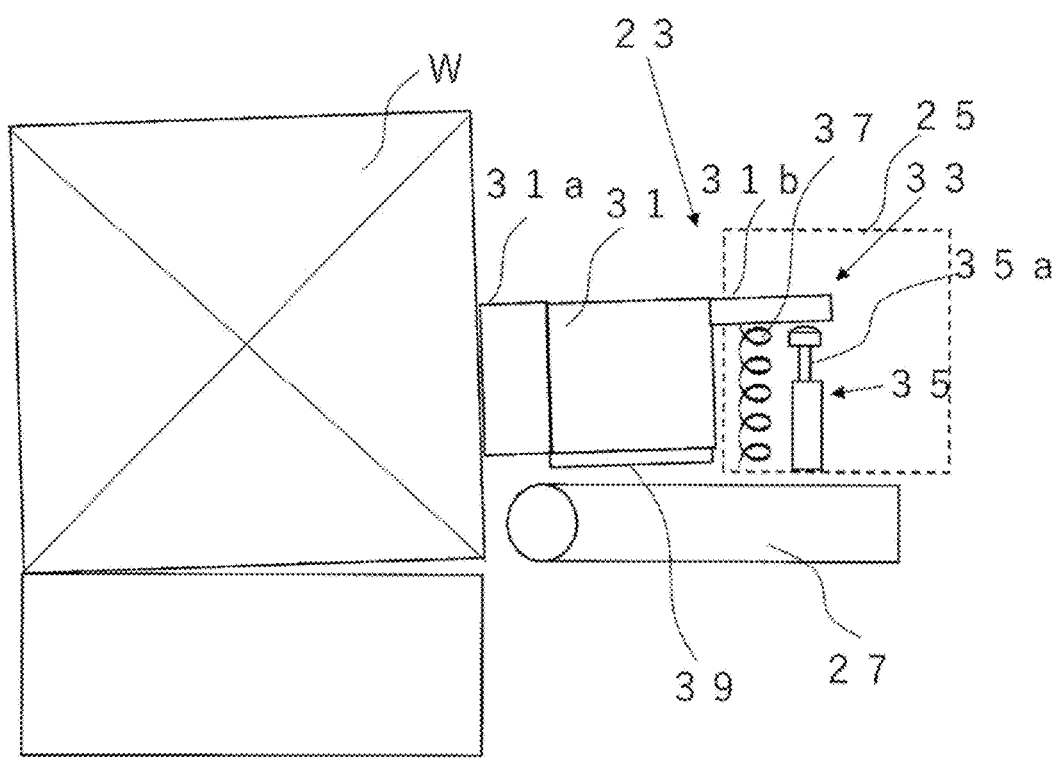
FIG. 23 is a schematic view for explaining operations of a cylinder, a spring, and a contact in a palletizing operation.
Figure 24:
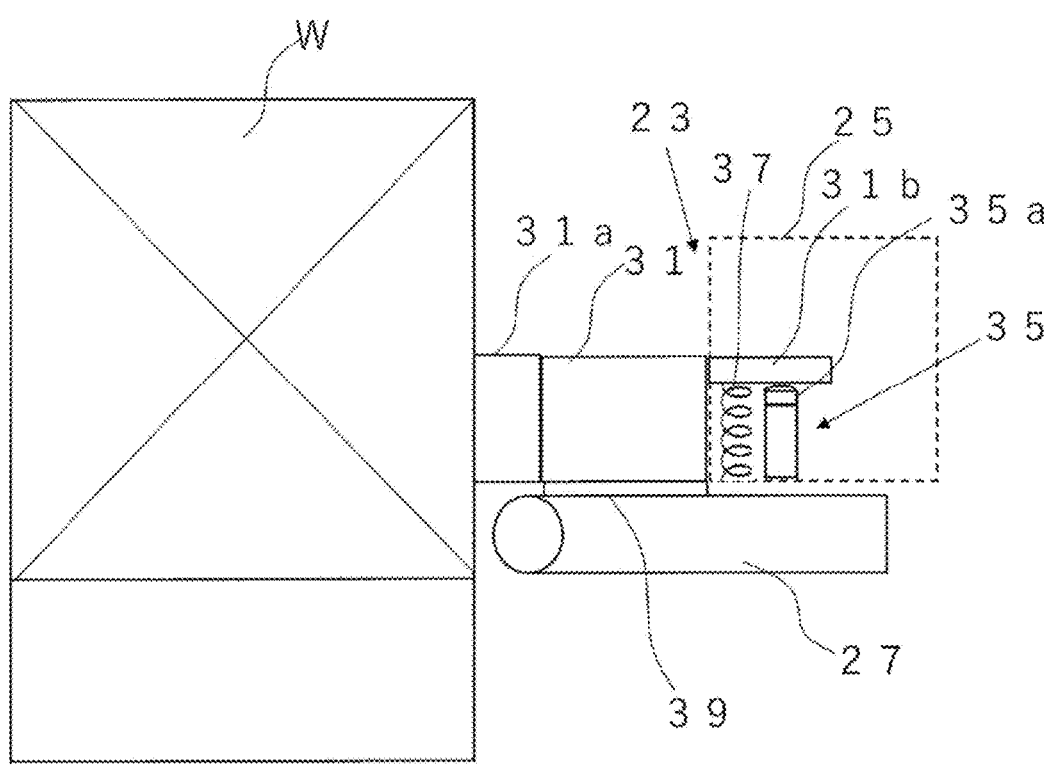
FIG. 24 is a schematic view for explaining operations of a cylinder, a spring, and a contact in a palletizing operation.

The operation of the suction device 31 descending after a corner of the article W abuts on an article W on the lower side in FIGS. 19 and 20 described above will be described in further detail with reference to FIGS. 22 to 24. FIGS. 22 to 24 are schematic views for explaining the operations of the cylinder, the spring, and the contact in the palletizing operation.

As illustrated in FIG. 22, the air cylinder 35 performs an operation of contracting the piston 35a. At this time, the article W and the suction device 31 are both oblique.

When a corner of the article W abuts on an article W on the lower side, the piston 35a of the air cylinder 35 subsequently is separated downward from the suction device 31 as illustrated in FIG. 23. Thus, the suction device 31 also descends together with the article W. At this time, the suction device 31 is caused to reliably descend by the urging force of the spring 37 in addition to the own weight of the suction device 31 and the article W.

As illustrated in FIG. 24, the suction device 31 abuts the transfer table 27 and is placed on the transfer table 27. At this time, the contacts 39 actually abut the transfer table 27. Accordingly, the contacts 39 define and function as a cushioning material, so that the suction device 31 and the transfer table 27 are hardly damaged.

A preferred embodiment of the present invention can be also described as follows.

The hand 23 (an example of a transfer device) is a device that transfer an article W (an example of an article) by moving the article in the front-rear direction, and includes the hand base 25 (an example of a base portion), the transfer table 27 (an example of a support plate), the transfer table actuator 29 (an example of a front-rear actuator), the suction device 31 (an example of a suction device), and the air cylinder 35 (an example of a vertical actuator).

The transfer table 27 is movable in the front-rear direction with respect to the hand base 25, and can support a bottom surface of the article W.

The transfer table actuator 29 actuates the transfer table 27 in the front-rear direction with respect to the hand base 25.

The suction device 31 is provided on the hand base 25 so as to be movable in the vertical direction, and can suction a side surface of the article W.

The air cylinder 35 actuates the suction device 31 at least in an ascending direction with respect to the hand base 25, and supports the suction device 31 so as to be detachable from the suction device 31 in a descending direction.

An operation (depalletizing operation) of taking out one or a plurality of articles W from stacked articles W will be described.

With such a hand 23, the suction device 31 suctions a side surface of the article W (FIG. 13), and then the air cylinder 35 moves the suction device 31 upward to lift the article W (FIG. 14). Next, the transfer table actuator 29 moves the transfer table 27 frontward, and inserts the transfer table 27 below the article W (FIG. 15). Next, the entire hand 23 is moved rearward while the transfer table actuator 29 is moving the transfer table 27 frontward (FIG. 16). Thus, the suction device 31 and the article W are pulled onto the transfer table 27. Finally, the air cylinder 35 lowers the suction device 31 downward. When a lower surface of the article W comes into contact with the transfer table 27 during the descending operation of the suction device 31, the air cylinder is then separated from the suction device 31, so that the suction device 31 descends together with the article W (FIG. 17). Finally, the article W is placed on the transfer table 27.

With such a hand 23, the load of the article W can be put on the transfer table 27 while the suction device 31 is suctioning the article W. Accordingly, a large load does not act on the suction device 31. As a result, the safety of the suction device 31 is improved.

Other Preferred Embodiments

Although preferred embodiments of the present invention have been described above, the present invention is not limited to the above preferred embodiments, and various modifications can be made without departing from the spirit of the invention. In particular, a plurality of preferred embodiments and alternative preferred embodiments described in this specification can be arbitrarily combined as needed.

Although the hand is fixed to the robot arm in the first preferred embodiment, any device that can move back and forth may be used in other transfer apparatuses.

The belt does not have to be wound around the transfer table.

The suction method of the suction device is not limited to air suction. An electrostatic suction method may be used.

Although the vertical actuator includes a combination of an air cylinder and a spring in the first preferred embodiment, the vertical actuator may have only a cylinder. In such a case, the suction device is caused to descend by its own weight. It is to be noted that a motor may be used to cause the suction device to descend.

Although the cam is switched between a non-swingable state and a swingable state depending on the height position of the suction device in the first preferred embodiment, the above-described operation may be realized by other mechanisms such as an electric lock device.

Preferred embodiments of the present invention can be widely applied to transfer devices for taking out one or a plurality of articles from a stack of articles.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A transfer device to transfer an article by moving the article in a front-rear direction, the transfer device comprising:
    a base portion;
    a support plate that is movable in the front-rear direction with respect to the base portion and is able to support a bottom surface of the article;
    a front-rear actuator that actuates the support plate in the front-rear direction with respect to the base portion;
    a suction device that is provided on the base portion so as to be movable in a vertical direction and able to suction a side surface of the article; and
    a vertical actuator that actuates the suction device at least in an ascending direction with respect to the base portion and supports the suction device so as to be detachable from the suction device in a descending direction; wherein the vertical actuator includes:
  a cylinder that pushes up the suction device; and
  a spring that urges the suction device downward.

2. The transfer device according to claim 1, wherein
the front-rear actuator is able to move the support plate to a rear side of a position of the suction device in the front-rear direction; and
the vertical actuator is able to cause the suction device to descend to a position overlapping the support plate in a height direction.

3. The transfer device according to claim 2, further comprising a holder including a cam that fixes the suction device at a descending position so as to be not swingable and holds the suction device at an ascending position so as to be swingable.

4. The transfer device according to claim 2, further comprising a contact provided on a lower surface of the suction device.

5. The transfer device according to claim 1, further comprising a holder including a cam that fixes the suction device at a descending position so as to be not swingable and holds the suction device at an ascending position so as to be swingable.

6. The transfer device according to claim 1, further comprising a contact provided on a lower surface of the suction device.

7. A transfer device to transfer an article by moving the article in a front-rear direction, the transfer device comprising:
  a base portion;
  a support plate that is movable in the front-rear direction with respect to the base portion and is able to support a bottom surface of the article;
  a front-rear actuator that actuates the support plate in the front-rear direction with respect to the base portion;
  a suction device that is provided on the base portion so as to be movable in a vertical direction and able to suction a side surface of the article;
  a vertical actuator that actuates the suction device at least in an ascending direction with respect to the base portion and supports the suction device so as to be detachable from the suction device in a descending direction; and
  a holder including a cam that fixes the suction device at a descending position so as to be not swingable and holds the suction device at an ascending position so as to be swingable.

8. The transfer device according to claim 7, further comprising a contact provided on a lower surface of the suction device.

* * * * *